US009540802B2

(12) United States Patent
Deiss

(10) Patent No.: US 9,540,802 B2
(45) **Date of Patent: *Jan. 10, 2017**

(54) PRECOMPRESSED SEALING TAPE

(75) Inventor: Martin Deiss, Abtsgmuend (DE)

(73) Assignee: ISO-Chemie GmbH (DE)

( * ) Notice: Subject to any disclaimer, the term of this patent is extended or adjusted under 35 U.S.C. 154(b) by 991 days.

This patent is subject to a terminal disclaimer.

(21) Appl. No.: 12/728,808

(22) Filed: Mar. 22, 2010

(65) Prior Publication Data

US 2011/0143122 A1 Jun. 16, 2011

(30) Foreign Application Priority Data

Dec. 11, 2009 (EP) .................................... 09178899

(51) Int. Cl.

*B32B 7/12* (2006.01)
*E04B 1/68* (2006.01)
*E06B 1/62* (2006.01)

(52) U.S. Cl.

CPC ............... *E04B 1/6812* (2013.01); *E06B 1/62* (2013.01); *E06B 2001/626* (2013.01); *Y10T 428/15* (2015.01); *Y10T 428/249953* (2015.04); *Y10T 428/249982* (2015.04); *Y10T 428/249983* (2015.04)

(58) Field of Classification Search

None

See application file for complete search history.

(56) References Cited

U.S. PATENT DOCUMENTS

| | | | | |
|---|---|---|---|---|
| 3,936,565 | A * | 2/1976 | Good | 428/314.8 |
| 4,204,373 | A | 5/1980 | Davidson | |
| 6,672,597 | B1 * | 1/2004 | Irrgeher et al. | 277/650 |
| 2005/0159496 | A1 * | 7/2005 | Bambara et al. | 521/50 |
| 2008/0134595 | A1 | 6/2008 | Collins | |

FOREIGN PATENT DOCUMENTS

| | | | | |
|---|---|---|---|---|
| EP | 1131525 | B1 | 3/2004 | |
| EP | 1959065 | A1 * | 8/2008 | E04B 1/68 |
| WO | WO 9845565 | A1 * | 10/1998 | E06B 1/64 |
| WO | WO9845565 | A1 | 10/1998 | |

OTHER PUBLICATIONS

Iso Chemie GMBH, Sealing Tape for Sealing a Groove, Aug. 20, 2008, translation of EP1959065A1.*

* cited by examiner

*Primary Examiner* — Chinessa Adkins

(74) *Attorney, Agent, or Firm* — Janson Munger McKinley & Kirby Ltd.

(57) ABSTRACT

The precompressed sealing tape for sealing a joint has an elastically re-expandable foam strip. The sealing tape also has a sheet-like wrapping, which at least partially surrounds the foam strip, and a strip-like element, which is arranged in the area of a lower transverse surface of the foam strip and which has greater flexural strength than the foam strip. A first section of the sheet-like wrapping is arranged between the lower transverse surface of the foam strip and the strip-like element.

16 Claims, 2 Drawing Sheets

PRECOMPRESSED SEALING TAPE

CROSS REFERENCE TO RELATED APPLICATION

This application claims priority based on European patent application EP 09 178 899.2, filed Dec. 11, 2009.

FIELD OF THE INVENTION

The invention relates to a precompressed sealing tape for sealing a joint such as that between a frame profile of a window or a door and the wall of a building.

BACKGROUND OF THE INVENTION

A precompressed sealing tape, which consists of an elastically re-expandable foam strip of rectangular cross section, which, in the compressed state, is completely surrounded by a wrapping formed by a sheet of plastic, is known from EP 1 131 525 B1. The sheet of plastic forms a tear-off tab extending in the longitudinal direction of the sealing tape, for which purpose the sheet is bonded to itself to form a predetermined tear site. To hold the foam strip inside the pocket formed in this way, it is adhesively bonded on its bottom surface to the wrapping, and the bottom surface of the wrapping in turn can be adhered to a frame profile by separate adhesive means such as double-sided adhesive tape.

Sealing tapes of this type are bonded to the frame profile to be sealed, and after the frame profile has been installed in the rough opening in the wall of the building, the wrapping is torn open to allow the foam strip to recover elastically and thus to seal off the frame profile against the wall. In the case of these known sealing tapes, however, it is disadvantageous that they can be produced only in relatively narrow widths, because otherwise the recovery force of the precompressed sealing tape produces an oval-to-round shape inside the wrapping, which is unsuitable for installation. In association with the continually increasing requirements on sealing in buildings, however, it is desirable to provide precompressed sealing tapes in any desired width to achieve higher sealing values, better thermal insulation, and better sound damping.

WO 98/45565 A describes a sealing strip of foam material, which is surrounded by a wrapping. A stiff layer of cardboard or plastic can also be provided in the wrapping. After the sealing strip has been loosely laid in the joint to be sealed, the sheet-like wrapping is opened, and the foam strip expands slightly into the joint.

These embodiments suffer from the disadvantage that the stiff layer remaining in the joint does not meet high demands on thermal insulation, nor does it provide high sealing values, and therefore the overall sealing element is unsuitable for long-term use.

A sealing tape which consists of a surface strip for attachment to a frame profile with a foam strip arranged on top of the surface strip is described in U.S. Pat. No. 4,204,373. The foam strip is covered by a sheet of paper or plastic, which is adhered to the surface strip and holds the foam strip in the compressed state. Rip cords, which can be used to tear open the sheet after the frame profile equipped with the sealing tape has been installed in the building structure, extend along the edge of the cover sheet.

Shortcomings of these prior art designs include the large amount of space which the sealing tape occupies on both sides.

SUMMARY OF THE INVENTION

It is an object of the present invention to provide a precompressed sealing tape which is simple in design and easy to handle, which can be delivered in any desired width, and which can be easily applied and transported.

According to an aspect of the present invention, the sealing tape comprises an elastically re-expandable foam strip, extending farther in a longitudinal direction than in a transverse direction. The sealing tape includes two lateral surfaces and first and second transverse surfaces, which connect the lateral surfaces to each other. The sealing tape further includes a sheet-like wrapping, which at least partially surrounds the foam strip, and a strip-like element, which has a greater flexural strength in the transverse direction than the foam strip. The strip-like element is arranged in an area of the first transverse surface of the foam strip. A first section of the sheet-like wrapping is arranged between the first transverse surface of the foam strip and the strip-like element.

It is desirable and preferred that the compressed rectangular shape of the foam strip remains preserved even when the sealing tape is very wide. It is also desirable that the amount of space occupied by the sealing tape before it is used is minimal in all directions.

In a preferred embodiment, the first transverse surface of the foam strip is permanently connected to the strip-like element. This produces a reliable connection between the two layers and prevents the layers from slipping with respect to each other.

So that the tape can be attached to the frame component to be sealed, a fastening means for fastening the strip-like element to the structural component is provided in the area of the side of the strip-like element which faces away from the first transverse surface of the foam strip. Thus the sealing tape can be pre-mounted on the frame component, and after the frame component has been inserted into the opening in the building, the only additional step necessary is to open the wrapping to allow the foam strip to expand.

An especially simple and preferred way of attaching the sealing tape to the structural component is to use a double-sided adhesive strip as the fastening means. This adhesive strip can itself be covered by a cover sheet before the sealing tape is attached.

In one embodiment, the first section of the wrapping can be arranged between the first transverse surface of the foam strip and the strip-like element all the way across the first transverse surface.

In another embodiment, the first section of the wrapping can be arranged between the first transverse surface of the foam strip and the strip-like element only across a first part of the first transverse surface of the foam strip. Thus it is possible to produce a simple connection between the foam strip and the strip-like element, because most of the first transverse surface of the foam strip is available as a fastening surface.

In this embodiment, the sealing tape can be precompressed particularly effectively by arranging a second section of the wrapping between the first transverse surface of the foam strip and the strip-like element across a second part of the first transverse surface of the foam strip, specifically, a part which is opposite the first part of the transverse foam strip.

The sealing tape offers improved sealing properties if the strip-like element is made of foam and has a higher flexural strength that the foam strip.

It is advantageous for the strip-like element to have a flexural strength of more than 200 kPa, and preferably of more than 250 kPa. In another preferred embodiment, the strip-like element has a flexural strength of more than 300 kPa, and preferably of more than 400 kPa. In an especially preferred embodiment, the strip-like element has a flexural strength of more than 500 kPa, preferably of more than 1,000 kPa, and even more preferably of more than 2,000 kPa. In this way, the deformation of the sealing tape is effectively minimized even in the case of tapes of considerable width.

The wrapping preferably comprises a tear-off tab extending in the longitudinal direction, which serves as a pull element for opening the wrapping. Thus, after the sealing tape has been pre-mounted on the frame component to be sealed, the wrapping can be easily opened by the user.

It can be advantageous in each case for the wrapping to be provided with at least one predetermined tear site extending in the longitudinal direction of the sealing tape, preferably a perforation line, which makes it easier to open the wrapping.

In one embodiment, the sealing tape can be wound up into a roll, which greatly simplifies the transport and storage of the sealing tape.

If the structural component has already been equipped with an attached length of the sealing tape, installing the component at the construction site is extremely easy and uncomplicated. The structural component, furthermore, is then also provided with additional protection during transport.

BRIEF DESCRIPTION OF THE DRAWINGS

In order that the advantages of the invention will be readily understood, a more detailed description of the invention and the preferred embodiments briefly described above will be rendered by reference to specific embodiments that are illustrated in the appended drawings. Understanding that the drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Figure 1:
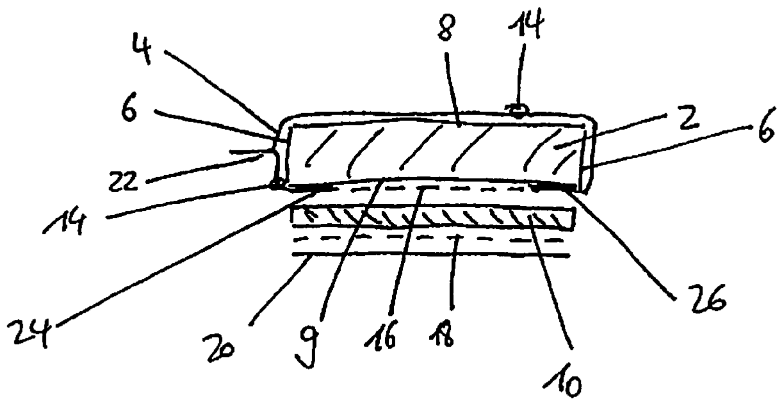
FIG. 1 is a transverse cross-sectional view of one preferred embodiment of the precompressed sealing tape for sealing a joint.

In some cases, the foam strips, wrappings, adhesive tapes, strip-like elements and cover sheets are shown in the drawings as if they were a certain distance apart, so that the individual elements which form the sealing tape can be clearly distinguished from each other. In these preferred embodiments, these elements lie directly on top of each other.

FIGS. 1-6 show preferred embodiments illustrating a foam strip 2, which, in the present preferred embodiments, has a rectangular cross section, is partially surrounded by a sheet-like wrapping 4, and is held in a precompressed state. Foam strip 2 can be made of any desired open-cell or closed-cell soft foam, such as polyurethane or polyethylene, and can be impregnated to delay its recovery. A multi-layer arrangement of several different foam materials laminated onto each other is also conceivable, as is the arrangement of an impregnated foam layer on or next to a foam layer which is not impregnated. Different foam layers can be arranged adjacent to each other especially in the transverse direction of the sealing tape to give the sealing tape a different permeability to air in the inner area than in the outer area, for example, or to create a vapor diffusion gradient. Foam strip 2 extends farther in its longitudinal direction than in its transverse direction and comprises two lateral surfaces 6 and first and second transverse surfaces 8, 9 (top surface 8 and bottom surface 9), which connect the two lateral surfaces 6 to each other.

The material of wrapping 4 can be a foil or film material, a mesh fabric, paper, or some other material suitable for the application cited. Laminated sheets consisting of a layer of plastic laminated to a backing material (e.g., a nonwoven) or fabric-reinforced sheets can also be used. All these materials are described by the term "sheet-like". Combinations of these materials are also possible. A thermoplastic film or a heat-shrink film, which contracts under the action of heat, however, is preferred. Such a heat-shrink effect can also be applied to only parts of wrapping 4, e.g., in the area of top surface 8 of foam strip 2, to make it taut and free of wrinkles. It is also possible for wrapping 4 to include reinforcement only in the area of top surface 8 of foam strip 2.

In the preferred embodiments, in the area of at least one transverse surface, specifically at bottom surface 9 of foam strip 2, a strip-like element 10 is positioned, which has a certain flexural strength in the transverse direction. The flexural strength should be high enough that strip-like element 10 can absorb the force which proceeds from or is caused by the attempt of foam strip 2 to expand. Under normal circumstances, such force would lead to a deformation of flexible wrapping 4, causing it to resemble a tube with an oval or even a round cross section, without strip-like element 10 itself undergoing any significant deformation.

A foam which has a much higher flexural strength than foam strip 2 is provided as the material for strip-like element 10. This is discussed in greater detail below. Cardboard or any other stiff material, including rigid plastic and the like, can be used in other preferred embodiments.

In certain preferred embodiments, strip-like element 10 should be flexible enough in the longitudinal direction that the sealing tape can be wound up into a roll.

In the examples of FIGS. 1, 2, 5, and 6, a tear-off tab 22 is provided, which is formed by two sections of wrapping 4, which are joined to each other. It is also possible to provide only one flag-like, extended section of wrapping 4 to serve as a tear-off tab. Wrapping 4 is opened by pulling on the tear-off tab, and foam strip 2 is thus free to expand. For this purpose, at least one predetermined tear site 14, preferably a perforation line, can be provided in wrapping 4 in the area of lateral surface 6 from which tear-off tab 22 projects. The positions of predetermined tear sites 14 shown in FIGS. 1, 2, 5, and 6, however, are preferred, because in this case, after wrapping 4 has been opened, little or no material remains on left lateral surface 6, and most of wrapping 4 slides along expanding foam strip 2 and arranges itself across right lateral surface 6. Advantage can be taken of this effect when, for example, wrapping 4 comprises special sealing properties which serve to provide a special sealing effect for right lateral surface 6, possibly in the form of a vapor diffusion barrier. Many other positions, however, can be imagined for predetermined tear sites 14 within the scope of the invention.

Wrapping 4 can also be reinforced in the area next to the predetermined tear site 14 by thermal hardening of the sheet, for example, by additional application of an adhesive strip, or by the thermal lamination of a plastic strip or plastic sheet. As a result, a mechanism is created which limits the extent to which wrapping 4 can tear, so that, after wrapping 4 has been separated at predetermined tear site 14, it will not continue to tear in an uncontrolled manner in the area next to predetermined tear site 14.

Wrapping 4 can also be torn open by pulling on tear-off tab 22 without the need for a predetermined tear site. Alternatively, wrapping 4 can be torn open with a rip cord, or the wrapping can be cut open with a knife or some other tool. Finally, the entire wrapping can be removed if wrapping 4 can be detached from foam strip 2 or from strip-like element 10 by pulling on it.

As shown in the drawings, tear-off tab 22, can be arranged on the outside surface (on the left in FIGS. 1, 2 and 5-6), but, for reasons of better accessibility after installation of structural component 12 (e.g., for installations in a facade or outside wall), it can also be arranged on the inside surface. Two tear-off tabs 22 can also be provided, one on the inside surface and one on the outside surface, so that wrapping 4 can be opened from the inside or alternatively from the outside.

In the preferred embodiments shown, double-sided adhesive tape 16 is arranged between one of the transverse surfaces of foam strip 2, specifically between bottom surface 9 and strip-like element 10, and connects the two elements tightly together. The tight connection between foam strip 2 and strip-like element 10 can also be achieved by other means, such by thermoplastic lamination and other formation processes.

A fastening means 18, which serves to attach the sealing tape to a component 12 such as a frame profile of a window to be installed in a building (see FIGS. 2 and 6) is arranged in the area of strip-like element 10. In the preferred embodiments according to FIGS. 1-5, fastening means 18 is in the form of an adhesive strip, the outside surface of which, i.e., the downward-facing surface, preferably is kept covered by a peel-off cover sheet 20, such as silicone paper or the like, until the sealing tape is to be attached to component 12. It should be appreciated that, in practice, the adhesive strip is very often realized by a layer of adhesive, which has been applied to a piece of silicone paper or the like, and which has then been laminated in this form to strip-like element 10. In some cases, a scrim or a support film, nonwoven fabric, or the like can also be embedded in this adhesive layer to increase the tensile strength. The expression “adhesive strip” used herein should therefore also include adhesive layers of the type just described. The same applies to the term “adhesive tape”.

In the embodiments of FIGS. 1-6, a first section 24 of sheet-like wrapping 4 is arranged between first transverse surface 9 of foam strip 2 and strip-like element 10.

Figure 2:
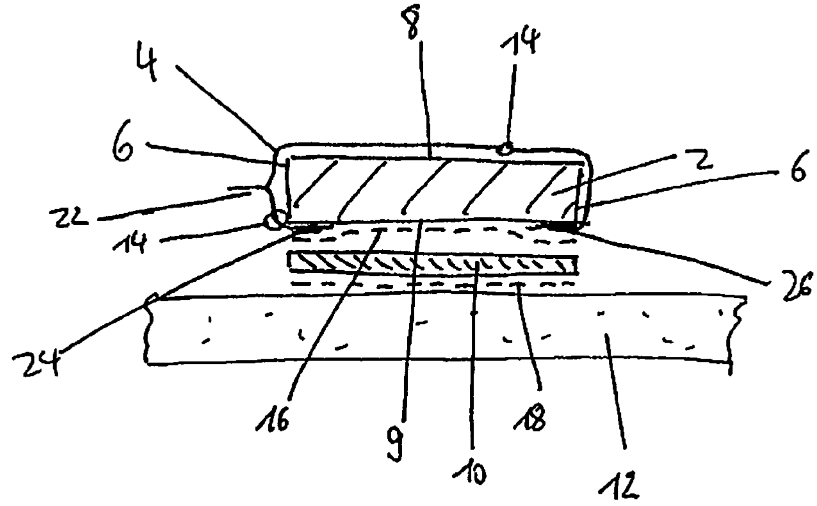
FIG. 2 is a transverse cross-sectional view of another preferred embodiment of the precompressed sealing tape for sealing a joint, the tape being fastened to a structural component.
Figure 6:
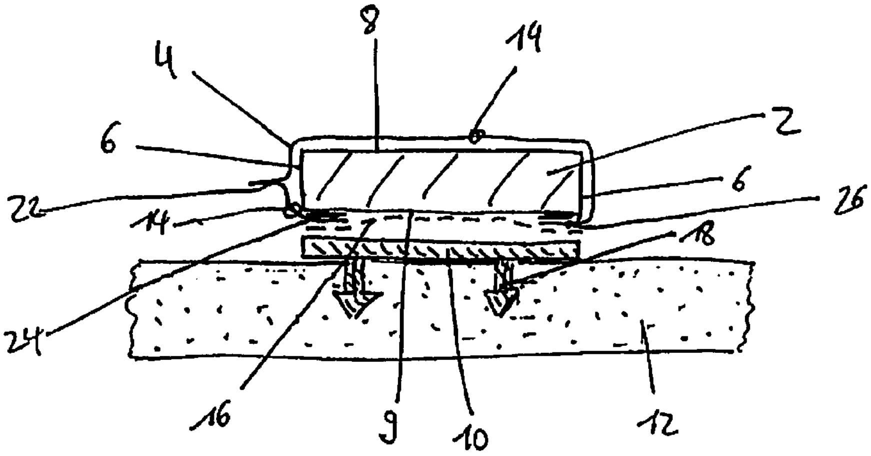
FIG. 6 is a transverse cross-sectional view of another preferred embodiment of the precompressed sealing tape for sealing a joint fastened to a structural component.

In the preferred embodiments of FIGS. 1, 2, and 6, the wrapping overlays and covers the two lateral surfaces 6 and top surface 8 of the foam strip 2. In the area of bottom surface 9 of foam strip 2, there is in each case a first section 24 of wrapping 4 which extends over part of the bottom surface of foam strip 2. In addition, a second section 26 of wrapping 4 extends between first transverse surface 9 and strip-like element 10 over a second part of first transverse surface, here bottom surface 9 of foam strip 2, namely, the part which is opposite the first part. Two sections 24 and 26 of wrapping 4 therefore extend around the two lower edges of foam strip 2, are folded over toward the inside, and attached there to foam strip 2, preferably bonded with an adhesive, or laminated or welded, to foam strip 2. Between two sections 24, 26 of wrapping 4, bottom surface 9 of foam strip 2 remains uncovered by wrapping 4. In FIG. 1, this is where the double-sided adhesive tape 16 is attached. Adhesive tape 16 can also extend over the two sections 24, 26 of wrapping 4, as shown in FIGS. 2 and 6.

In principle, the sealing tape can be produced in the form of strips or in the form of rolls. In the case of especially stiff materials of the strip-like element 10, however, the strip form is preferred.

FIGS. 2, and 6 show a structural component 12, to which the sealing tape has been attached. In a configuration such as this, the component 12 can be delivered to the construction site as a ready-to-install assembly. The connection between the sealing tape and component 12 is produced by fastening means 18. In FIG. 2, fastening means 18 is the adhesive strip, from which cover sheet 20 has been previously peeled. In FIG. 6, fastening means 18 is a keder or plug-in profile, which ensures a reliable connection and which preferably is connected by pushing the side of the tape onto the component or engaging it within the component by insertion or other means.

The sealing tape may be preferably fastened to frame component 12 by fastening means 18 before the component is installed or possibly even before it is transported. After it has been installed on-site in the intended opening in the building, the only step then required is to open wrapping 4 by cutting it with a knife or by pulling on tear-off tab 22. Strip-like element 10 (which is not usually expandable) fastened to frame component 12 remains unchanged, whereas foam strip 2 expands upward and produces the desired sealing effect in the joint. As this is happening, the part of wrapping 4 remaining in the joint slides along the expanded foam strip 2 and ultimately covers preferably at least part of its right lateral surface 6 in the final state.

Figure 3:
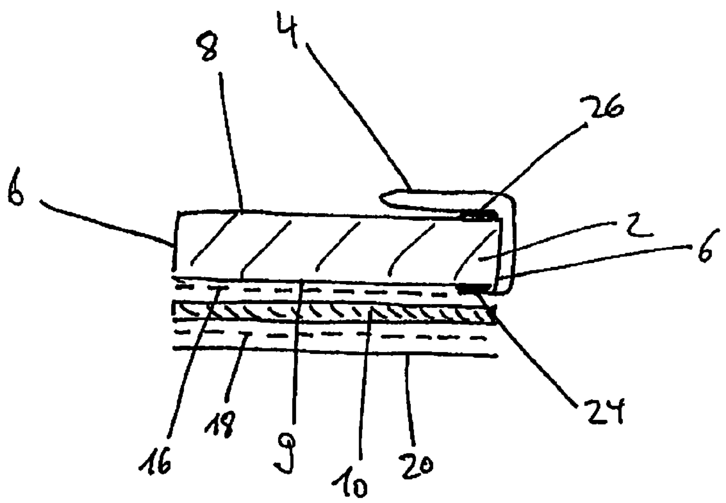
FIG. 3 is a transverse cross-sectional view of another preferred embodiment of the precompressed sealing tape for sealing a joint.

The preferred embodiment shown in FIG. 3 is usable only as roll material. In this case, first section 24 of wrapping 4 is arranged on the right outer edge area of bottom surface 9 of foam strip 2 and is bonded firmly in place. Wrapping 4 covers right lateral surface 6 of foam strip 2 and at least part of top surface 8 of foam strip 2. In the area of top surface 8, wrapping 4 is folded back on itself to form a first loop. A second section 26 of wrapping 4 located at the end of the loop is adhered tightly to top surface 9 of the foam strip 2. The loop therefore forms a reserve of material for the displacement of wrapping 4, the amount of which corresponds to the maximum desired expansion of foam strip 2.

After the sealing tape has been unwound from the roll, there is only a limited amount of time available to attach the sealing tape to component 12 and to insert component 12 into the opening in the wall provided for it before the delayed expansion of foam strip 2 makes the sealing tape too large to insert into the opening. Because current impregnating materials make it possible to delay the expansion of foam strip 2 by several hours, however, this does not represent a significant limitation.

Figure 4:
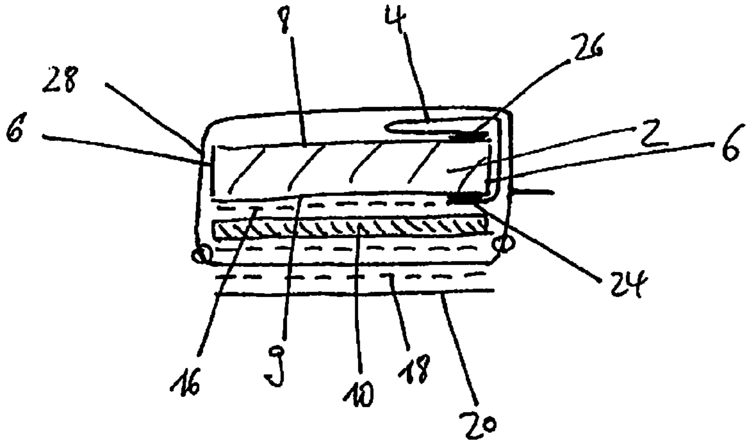
FIG. 4 is a transverse cross-sectional view of another preferred embodiment of the precompressed sealing tape for sealing a joint.

In the preferred embodiment shown in FIG. 4, a second wrapping 28 surrounds the sealing tape shown in FIG. 3. In this case, the sealing tape can also be produced in the form of a strip. Second wrapping 28 can also include a tear-off tab or be accessible to any other desired type of opening mechanism. Second wrapping 28 extends continuously along the bottom surface of strip-like element 10 and is bonded to it by means of an adhesive, for example, or by welding or by lamination, possibly only at one or two points. In this embodiment, adhesive strip 18 for fastening the sealing tape to structural component 12 is attached directly to second wrapping 28.

Figure 5:
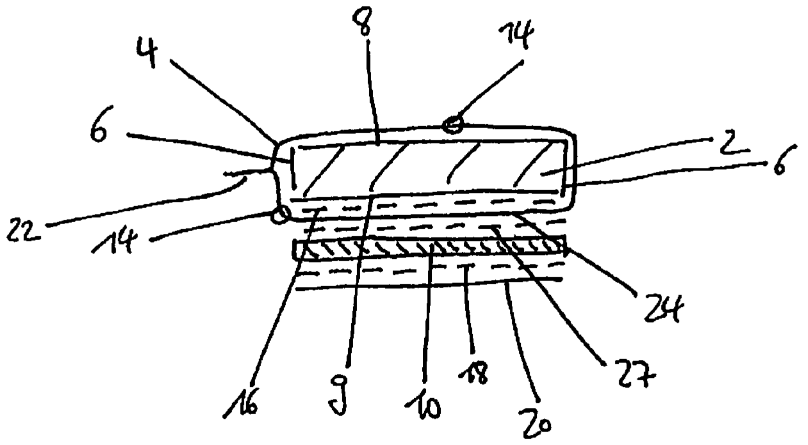
FIG. 5 is a transverse cross-sectional view of another preferred embodiment of the precompressed sealing tape for sealing a joint.

In the preferred embodiment illustrated in FIG. 5, first section 24 of wrapping 4 extends all the way across between foam strip 2 and strip-like element 10. First section 24 is attached to bottom surface 9 of foam strip 2 by a piece of double-sided adhesive tape 16, whereas another piece of double-sided adhesive tape 27 produces the connection between first section 24 of wrapping 4 and strip-like element 10. Instead of using adhesive tapes 16, 27 to fasten wrapping 4 to foam strip 2 and to strip-like element 10, the wrapping can also be bonded adhesively in some other way or welded or laminated in place. As also the case in the embodiments described herein (except for that of FIG. 3), wrapping 4 prevents foam strip 2 from expanding and thus holds it in the precompressed state.

Many other embodiments of the present invention are also conceivable. The details discussed with reference to any one of the preferred embodiments illustrated in FIGS. 1-6 can also be used in any of the other embodiments. Other designs are also conceivable, as long as at least one section of wrapping 4 is arranged between strip-like element 10 and foam strip 2.

In practice, foam strips 2 are usually precompressed in such a way that, when they expand, they increase preferably by up to about 5-10 times the thickness which they had in the precompressed state. Often, use is made of only about half of this possible expansion to guarantee that the tape will rest reliably against the construction element facing the profile element to be sealed.

A foam which has greater flexural strength than foam strip 2, preferably a much higher flexural strength, is provided as the material for strip-like element 10. The strip-like element has a flexural strength of more than 200 kPa, preferably of more 250 kPa, and in a preferred embodiment the strip-like element has a flexural strength of more than 300 kPa. In other preferred embodiments, the strip-like element has a flexural strength preferably of more than 400 kPa, in another preferred embodiment the strip-like element has a flexural strength of more than 1,000 kPa, and in another preferred embodiment more than 2,000 kPa. In this way, the deformation of the sealing tape is effectively minimized even in the case of very wide tapes.

The material of foam strip 2, however, has a flexural strength of less than 150 kPa, preferably of less than 125 kPa, and in another preferred embodiment, less than 100 kPa.

The flexural strength of the material of strip-like element 10 and of foam strip 2 is determined on the basis of the 3rd edition of the standard ISO 1209-2 from the year 2007. This international standard is usually used to determine the flexural strength of plastics, but may also be used in a somewhat modified form for determining the flexural strength of foam materials.

A steadily changing force is applied perpendicularly to the center of a test piece resting on two supports. The test piece therefore undergoes a certain deflection. The flexural strength is calculated from the measured force-versus-deformation curve (see Section 3 of ISO 1209-2). The testing device is described in detail in Section 4 (shown in FIG. 1 of ISO 1209-2). An example of a suitable testing device is model BZ2.5/TN1S from the Zwick Company in Ulm, Germany. The load cell used here can be, for example, the KAP-Z model for forces of up to 200 N.

The supports consist of two parallel cylindrical support elements, which are arranged on the same horizontal plane, and each of which has a radius of 15±1 mm. The support elements are longer than the test pieces are wide, and in the present case they are 80 mm long.

In the case of the present measurement, the distance L between the support elements is set at 85±2 mm and thus deviates from the value according to ISO 1209-2. The force-transmitting element has the same shape as the support elements. The other dimensions given in Section 5.1 of ISO 1209-2 have also been changed for the special application of measuring foams. Each measured foam test piece is a block with an edge length l of 150±3 mm, a width b of 40±2 mm, and a thickness d of 3±0.2 mm. The first set of test conditions described in Section 6 of ISO 1209-2 is used, i.e., measurement at 23±2° C. and 50±10% relative humidity. In contrast to the velocity of the movement of the force-transmitting element stated in Section 7 of ISO 1209-2, here it is moved downward at a speed of only 10±1 mm per minute. In addition, the force is measured up to a maximum deflection of the foam of 20 mm, and the maximum value $F_R$ of the force which occurs during the course of the measurement is recorded.

The calculation of the flexural strength R (in kPa) is carried out as described in Section 8.1 of the ISO 1209-2, i.e., by the use of the formula $R=1.5F_R \cdot L/bd^2 \cdot 10^6$, where $F_R$ is the maximum applied force in kN, L is the distance between the support elements in mm, b is the width of the test piece in mm, and d is the thickness of the test piece in mm.

At the specified values for L, b, and d, the measured force $F_R$ for the material of strip-like element 10 and foam strip 2 results in the values given herein.

The embodiments shown in FIGS. 1-6 are illustrated with a cross section of foam strip 2 of more-or-less idealized shape. In reality, top transverse surface 8 of foam strip 2 will extend at least slightly in the direction of a dome-like shape as a result of the pressure acting from within, so that the cross section of foam strip 2 in the precompressed state will assume a form which deviates to a certain extent, but not too severely, from that of a rectangle. A certain transverse bending (outward curvature) of stiff element 10 can also be observed in practice, especially in the case of very wide sealing tapes.

The invention has been described herein on the basis of a foam strip 1 with a rectangular cross section by way of example, because this makes it much easier to explain the invention and its various features. The term "rectangular" can also mean "square". The person skilled in the art will appreciate, however, that the invention can also be realized in a corresponding manner with foam strips which have cross sections different from that of a rectangle. The cross-sectional shape of foam strip 2 indicated herein should therefore not be understood as limiting in any way.

Reference throughout this specification to "one embodiment," "an embodiment," "a preferred embodiment" or similar language means that a particular feature, structure, or characteristic described in connection with the embodiment is included in at least one embodiment of the present invention. Thus, appearances of the phrases "in one embodiment," "in an embodiment," "in a preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention and its principles have been shown and described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the invention.

What is claimed is:

1. A precompressed sealing tape for sealing a joint, comprising:

an elastically re-expandable foam strip, extending farther in a longitudinal direction than in a transverse direction, which comprises two lateral surfaces and first and second transverse surfaces, which connect the two lateral surfaces to each other, a wrapping, which at least partially surrounds the foam strip, a stiff strip-shaped element defined as a strip-shaped element having a greater flexural strength in the transverse direction than the foam strip, wherein the stiff strip-shaped element is arranged in an area of the first transverse surface of the foam strip;

fastening means for attaching the stiff strip-shaped element to a component to be installed in a building;

wherein a first section of the wrapping is arranged between the first transverse surface of the foam strip and the stiff strip-shaped element, and wherein the fastening means is arranged in an area of the stiff strip-shaped element.

2. The precompressed sealing tape of claim 1 wherein the first transverse surface of the foam strip is fixedly connected to the stiff strip-shaped element.

3. The precompressed sealing tape of claim 1 wherein the fastening means for fastening the stiff strip-shaped element to the structural component is provided in an area of a side of the stiff strip-shaped element which faces away from the first transverse surface of the foam strip.

4. The precompressed sealing tape of claim 3 wherein the fastening means is formed as a double-sided adhesive strip.

5. The precompressed sealing tape of claim 1 wherein the first section of the wrapping extends between the first transverse surface of the foam strip and the stiff strip-shaped element all the way across the first transverse surface.

6. The precompressed sealing tape of claim 1 wherein the first section of the wrapping is arranged between the first transverse surface and the stiff strip-shaped element only across a first part of the first transverse surface of the foam strip.

7. The precompressed sealing tape of claim 6 wherein a second section of the wrapping is arranged between the first transverse surface and the stiff strip-shaped element across a second part of the first transverse surface of the foam strip, the second part being opposite the first part.

8. The precompressed sealing tape of claim 1 wherein the stiff strip-shaped element is made of foam and has a greater flexural strength than the foam strip.

9. The precompressed sealing tape of claim 8 wherein the stiff strip-shaped element has a flexural strength of more than 250 kPa.

10. The precompressed sealing tape of claim 8 wherein the stiff strip-shaped element has a flexural strength of more than 400 kPa.

11. The precompressed sealing tape of claim 8 wherein the stiff strip-shaped element has a flexural strength of more than 1,000 kPa.

12. The precompressed sealing tape of claim 1 wherein the wrapping comprises a tear-off tab extending in the longitudinal direction, which serves as pulling element for releasing the foam strip and allowing its expansion.

13. The precompressed sealing tape of claim 1 wherein the wrapping is provided with at least one predetermined tear site extending in the longitudinal direction.

14. The precompressed sealing tape of claim 13 wherein the at least one predetermined tear site is a perforation line.

15. The precompressed sealing tape of claim 1 wherein the sealing tape is wound up into a roll.

16. A structural component to be installed in a building, the structural component with a precompressed sealing tape fastened to it, the precompressed sealing tape comprising:

an elastically re-expandable foam strip, extending farther in a longitudinal direction than in a transverse direction, which comprises two lateral surfaces and first and second transverse surfaces, which connect the two lateral surfaces to each other, a wrapping, which at least partially surrounds the foam strip, and a stiff strip-shaped element defined as a strip-shaped element having a greater flexural strength than the foam strip, wherein the stiff strip-shaped element is arranged in an area of the first transverse surface of the foam strip, fastening means for attaching the stiff strip-shaped element to the structural component; wherein a first section of the wrapping is arranged between the first transverse surface of the foam strip and the stiff strip-shaped element, and wherein the fastening means is arranged in an area of the stiff strip-shaped element.

* * * * *